United States Patent
Cai et al.

(10) Patent No.: US 11,416,680 B2
(45) Date of Patent: Aug. 16, 2022

(54) CLASSIFYING SOCIAL MEDIA INPUTS VIA PARTS-OF-SPEECH FILTERING

(71) Applicant: SAP SE, Walldorf (DE)

(72) Inventors: Danqing Cai, Singapore (SG); Wei Tah Chai, Singapore (SG); Pek Gnee Ng, Singapore (SG); Subashini Rengarajan, Singapore (SG); Xin Zheng, Singapore (SG); Hang Guo, Singapore (SG); Weile Chen, Singapore (SG)

(73) Assignee: SAP SE, Walldorf (DE)

( * ) Notice: Subject to any disclaimer, the term of this patent is extended or adjusted under 35 U.S.C. 154(b) by 796 days.

(21) Appl. No.: 15/241,040

(22) Filed: Aug. 18, 2016

(65) Prior Publication Data

US 2018/0053116 A1     Feb. 22, 2018

(51) Int. Cl.
  *G06F 40/279*     (2020.01)
  *G06F 16/35*      (2019.01)

(52) U.S. Cl.
  CPC .......... *G06F 40/279* (2020.01); *G06F 16/353* (2019.01)

(58) Field of Classification Search
  CPC .......................... G06F 17/2765; G06F 16/353
  USPC .......... 704/9; 706/46, 47; 709/204; 707/740, 707/706
  See application file for complete search history.

(56) References Cited

U.S. PATENT DOCUMENTS

| | | | | |
|---|---|---|---|---|
| 6,847,731 B1* | 1/2005 | Caulfield | ............... | G06K 9/741 382/159 |
| 7,475,061 B2* | 1/2009 | Bargeron | ............ | G06K 9/00463 |
| 7,672,987 B2* | 3/2010 | Mukherjee | ............ | G06F 19/321 707/776 |
| 8,498,915 B2* | 7/2013 | Eder | ...................... | G06Q 40/06 705/36 R |
| 8,990,327 B2* | 3/2015 | Drews | .................... | G06Q 10/10 709/206 |
| 2006/0287966 A1* | 12/2006 | Srinivasaraghavan | | G06Q 10/10 705/80 |
| 2009/0284589 A1* | 11/2009 | Radeva | ................. | G06T 7/0012 348/77 |
| 2011/0165652 A1* | 7/2011 | Hardin | ................... | C07H 19/10 435/194 |
| 2012/0001919 A1* | 1/2012 | Lumer | .................... | H04L 67/22 345/440 |

(Continued)

OTHER PUBLICATIONS

Erlin et al,. Text Message Categorization of Collaborative Learning Skills in Online Discussion Using Support Vector Machine. 2013 International Conference on Computer, Control, Informatics and Its Applications (Year: 2013).*

(Continued)

*Primary Examiner* — Alexey Shmatov
*Assistant Examiner* — Robert Bejcek, II
(74) *Attorney, Agent, or Firm* — Fish & Richardson P.C.

(57) ABSTRACT

Described herein is a framework for classifying social media inputs. In accordance with one aspect of the framework, one or more social media inputs is acquired from one or more social media platforms. The social media inputs are cleaned to remove redundant elements. One or more features are extracted from the cleaned social media inputs. The social media inputs are classified by a trained classifier into predefined categories using the extracted one or more features.

18 Claims, 7 Drawing Sheets

(56) References Cited

U.S. PATENT DOCUMENTS

| | | | | |
|---|---|---|---|---|
| 2013/0111488 | A1* | 5/2013 | Gatti | G06Q 10/06 |
| | | | | 718/103 |
| 2013/0191395 | A1* | 7/2013 | Dowlaty | G06Q 50/01 |
| | | | | 707/740 |
| 2014/0136188 | A1* | 5/2014 | Wroczynski | G06F 17/2872 |
| | | | | 704/9 |
| 2014/0314271 | A1* | 10/2014 | Xu | G06K 9/00369 |
| | | | | 382/103 |
| 2015/0088593 | A1* | 3/2015 | Raghunathan | H04L 51/32 |
| | | | | 705/7.27 |
| 2017/0352348 | A1* | 12/2017 | Wang | G06F 17/277 |

OTHER PUBLICATIONS

Enxox. Removing Emoji Code. Drupal.org. 2013. (Year: 2013).*

Bonatti et al. Effect of Part-of-Speech and Lemmatization Filtering in Email Classification for Automatic Reply. Association for the Advancement of Artificial Intelligence. 2015. (Year: 2015).*

Default English stopwords list. Stopwords List. Mar. 21, 2016 (Year: 2016).*

Jason Clampet, The secret to American Airlines' customer service success on Twitter, "http://skift.com/2013/01/22/skiftsocial-american-airlines-twitter-experts-on/", Jan. 2013, Skift.

John Koetsier,Tune, KLM's 150 social media customer service agents generate $25M in annual revenue, "http://venturebeat.com/2015/05/21/klms-150-social-media-customer-service-agents-generate-25m-in-annual-revenue/"', May 2015, VentureBeat.

Conversocial, The Definitive Guide to Social Customer Service: From Reach to Resolution, "http://www.conversocial.com/social-customer-service/the-three-stages-of-social-media-maturity", 2015.

Hootsuite, Social Customer Service Solutions, Deliver ore responsive social customer service, "https://hootsuite.com/solutions/social-customer-service", retrieved online on Nov. 9, 2016, Hootsuite Media Inc.

Zendesk, Providing Great Customer Service Through Social Media, "https://www.zendesk.com/resources/customer-service-through-social-media/", retrieved online on Nov. 9, 2016.

Zendesk, Why are Customers Turning to Social Media?, "https://www.zendesk.com/resources/instaservice/", retrieved online on Nov. 9, 2016.

Ekaterina Walter, 4 Social Customer Care Rules You Can't Ignore, "http://www.forbes.com/sites/ekaterinawalter/2015/01/15/4-social-customer-care-rules-you-cant-ignore/#5c8c7bc829a5", Jan. 15, 2015, Forbes.

Bryan Haines, 14 Amazing Social Media Customer Service Examples (And What You Can Learn From Them), The Buffer Blog, "https://blog.bufferapp.com/social-media-customer-service", Dec. 29, 2015, Buffer Inc.

Luke Chitwood, 5 Strategies Behind Awesome Customer Service on Social Media, Social Media, "http://thenextweb.com/socialmedia/2014/07/21/5-strategies-behind-awesome-customer-service-social-media/#gref", Jul. 21, 2014, The Next Web B.V . . . .

* cited by examiner

Fig. 6

| | | | | Carl Mason |
|---|---|---|---|---|
| Home | ☰ Social Media | | | |
| Calendar | Messages Today | | Search | |
| ∧ Sales | Auto Class | Subject | | Channel |
| ∨ Service | Complaints | How is it possible that after booking a holiday 6 months ago, all of a sudden we are told the hotel is no longer available? | | World of travelers |
| Tickets | Complaints | This is a nightmare no clue where to go or what to do #marooned | | World of travelers |
| Work Tickets | Queries | When does your Summer term end and Winter begin? | | World of travelers |
| Unassociated E-mails | Queries | Please can you assist me with the latest arrival time I know it has been delayed | | World of travelers |
| Territories | Queries | Hi there I was wondering if there is someone help to manage my booking, I cannot see the full passenger details. | | World of travelers |
| Live Activity Center | Comments | Just landed, thanks for the easy ride from LA to SG | | World of travelers |
| Social Media | Complaints | Your chat app is not working, I wasted my time waiting for nothing. | | World of travelers |
| | Queries | Yyyyyy yy | | World of travelers |
| | Complaints | Xxxx yyyyy | | World of travelers |
| | Queries | Yyyyyy xxx | | World of travelers |
| | | | | New |

Fig. 7

CLASSIFYING SOCIAL MEDIA INPUTS VIA PARTS-OF-SPEECH FILTERING

TECHNICAL FIELD

The present disclosure relates generally to computer systems, and more specifically, to a framework for processing social media inputs.

In the past, consumers were considered to be at the bottom of the consumerism pyramid for not being able to share their opinions or feedbacks about products with others or display their dissatisfaction with the services received due to the lack of communication outlet. Today, in the digital and social sphere that we live in, consumers are able to convey their opinions, criticism or praise, about products they purchased or services they received, via various social media platforms, such as Twitter, Facebook and others. By using social media platforms as a communication outlet, consumers are able to get a timely response to their opinion/feedback, prompting the product or service providers to change their products or improve their services.

Although social media platforms pose various challenges for product or service providers, they also offer vast opportunities to the product or service providers. For example, the product or service providers may engage various social media platforms for fast brand promotion through promotional offers, rewards and other marketing means, as well as for business expansion through seeking investors online, for example. In addition, consumers' inputs, such as feedbacks and opinions, are beneficial for the product or service providers in producing better quality products and enhancing customer experience. The product or service providers may also utilize social media platforms to avoid a tarnished reputation by promptly addressing criticism or complaints, such that any damages can be contained immediately.

The social media inputs, however, are noisy, unstructured and often contain certain level of ambiguity, making them difficult to be processed. Typically, most product or service providers engage a team of agents to monitor social channels of various social media platforms and redirecting the inputs to traditional services, such as emails and phone calls, in an ad hoc way. Such a method is not only time consuming, it also requires additional overhead which increases operational costs. Furthermore, consumers who complain on social media platforms often expect prompt responses from the product or service providers. However, due to the lack of efficient workflows to handle such inputs, the product or service providers are not able to provide a prompt response or in the worst case, consumer complaints may be overlooked or buried in the large amount of inputs.

Therefore, it is desirable to provide an efficient automated method for processing social media inputs, including classifying the inputs into categories.

SUMMARY

A framework for classifying social media inputs is described herein. In accordance with one aspect of the framework, one or more social media inputs is acquired from one or more social media platforms. The social media inputs are cleaned to remove redundant elements. One or more features are extracted from the cleaned social media inputs. The social media inputs are classified by a trained classifier into predefined categories using the extracted one or more features.

With these and other advantages and features that will become hereinafter apparent, further information may be obtained by reference to the following detailed description and appended claims, and to the figures attached hereto.

BRIEF DESCRIPTION OF THE DRAWINGS

Some embodiments are illustrated in the accompanying figures, in which like reference numerals designate like parts, and wherein:

FIG. 6 shows an exemplary third level UI of a standalone application illustrating a classifying result; and FIG. 7 shows an exemplary UI of an integrated application with a cloud system illustrating a classifying result.

DETAILED DESCRIPTION

Figure 1:
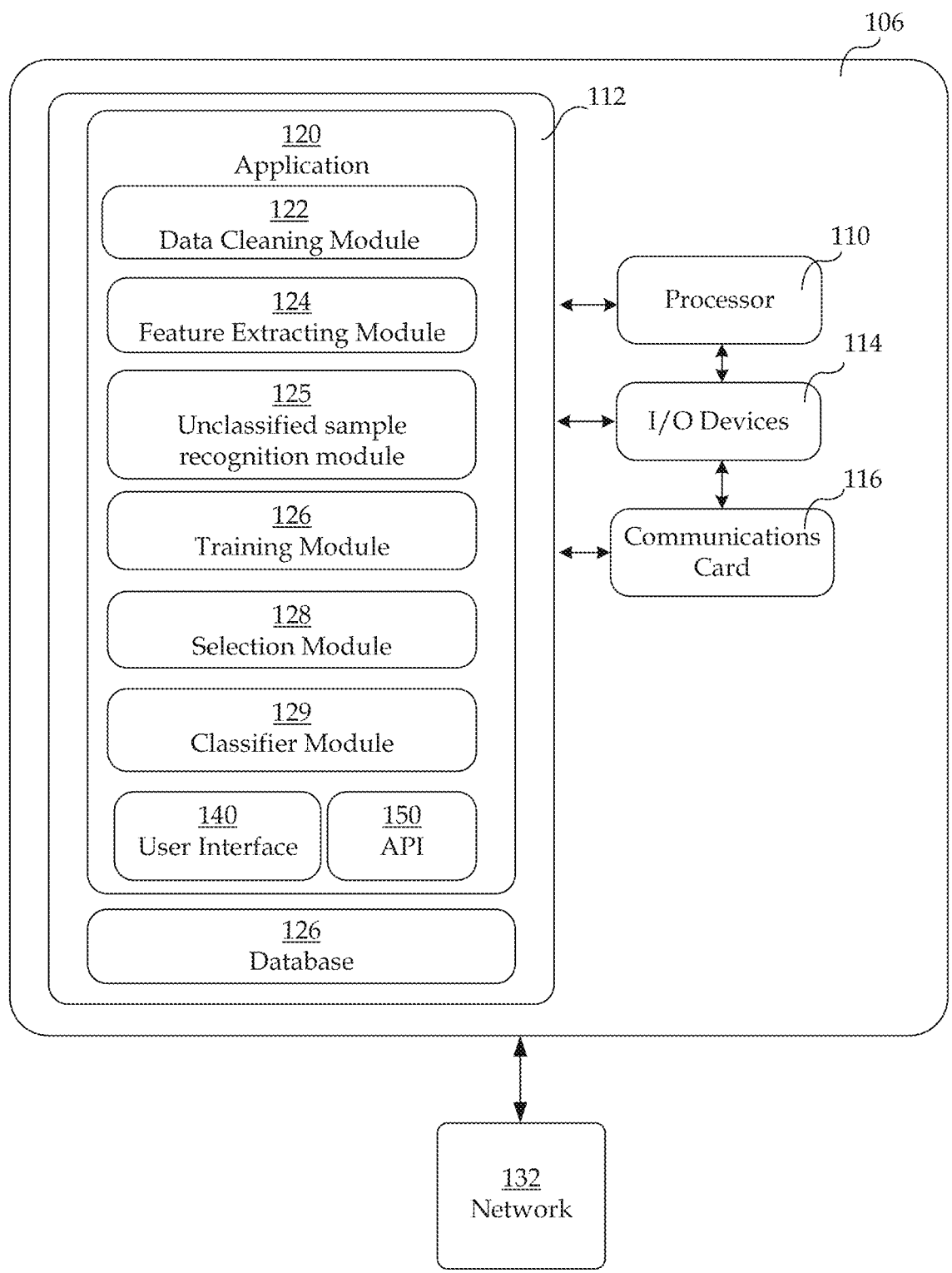
FIG. 1 is a block diagram illustrating an exemplary architecture.

In the following description, for purposes of explanation, specific numbers, materials and configurations are set forth in order to provide a thorough understanding of the present frameworks and methods and in order to meet statutory written description, enablement, and best-mode requirements. However, it will be apparent to one skilled in the art that the present frameworks and methods may be practiced without the specific exemplary details. In other instances, well-known features are omitted or simplified to clarify the description of the exemplary implementations of the present framework and methods, and to thereby better explain the present framework and methods. Furthermore, for ease of understanding, certain method steps are delineated as separate steps; however, these separately delineated steps should not be construed as necessarily order dependent in their performance.

A framework for processing social media inputs of various social media platforms/channels is described herein. Social media inputs are posted by consumers using a product or service on one or more social media platforms. Social media inputs, for example, may be categorized into comments, complaints, queries and others. Comments, for example, may include consumers' opinions or feedbacks regarding a purchased product or service received from a provider. Complaints, for example, may include statements or expressions of unsatisfactory and discontent regarding a purchased product or service rendered by a provider. Queries, on the other hand, may include requests for information about a product or service. Other categories, for example, may include miscellaneous subjects, such as sharing information, which do not fall within the categories of comments, complaints or queries. In general, comments and inputs that fall into the miscellaneous subjects may require neither follow-up actions nor attention. On the other hand, inputs that fall within the categories of complaints and queries may require prompt follow-up actions and attention. The social media platforms/channels, for example, may include Twitter, LinkedIn, Facebook, YouTube, Instagram, Pinterest, and etc.

In accordance with one aspect, the framework described herein automatically classifies social media inputs (hereinafter "inputs") from selected social media channels (hereinafter "channels") into predefined or predetermined categories (or classes). The inputs may be acquired or harvested from various channels selected by a user. The categories or classes, for example, are predetermined by the user, depending on the needs and business interests of the user. The harvested inputs are automatically classified into the predefined categories or classes using a trained model/classifier.

It should be appreciated that the framework described herein may be implemented as a method, a computer-controlled apparatus, a computer process, a computing system, or as an article of manufacture such as a computer-usable medium. These and various other features and advantages will be apparent from the following description.

FIG. 1 is a block diagram illustrating an exemplary architecture 100 in accordance with one aspect of the present framework. Generally, exemplary architecture 100 may include a computer system 106.

Computer system 106 is capable of responding to and executing computer-readable instructions in a defined manner. Computer system 106 may include a processor 110, input/output (I/O) devices 114 (e.g., touch screen, keypad, touch pad, display screen, speaker, etc.), a memory module 112, and a communications card or device 116 (e.g., modem and/or network adapter) for exchanging data with a network 132 (e.g., local area network or LAN, wide area network (WAN), Internet, etc.). It should be appreciated that the different components and sub-components of computer device 106 may be located or executed on different machines or systems. For example, a component may be executed on many computer systems connected via the network at the same time (i.e., cloud computing).

Memory module 112 may be any form of non-transitory computer-readable media, including, but not limited to, dynamic random access memory (DRAM), static random access memory (SRAM), Erasable Programmable Read-Only Memory (EPROM), Electrically Erasable Programmable Read-Only Memory (EEPROM), flash memory devices, magnetic disks, internal hard disks, removable disks or cards, magneto-optical disks, Compact Disc Read-Only Memory (CD-ROM), any other volatile or non-volatile memory, or a combination thereof. Memory module 112 serves to store machine-executable instructions, data, and various software components for implementing the techniques described herein, all of which may be processed by processor 110. As such, computer device 106 is a general-purpose computer system that becomes a specific-purpose computer system when executing the machine-executable instructions. Alternatively, the various techniques described herein may be implemented as part of a software product. Each computer program may be implemented in a high-level procedural or object-oriented programming language (e.g., C, C++, Java, JavaScript, Advanced Business Application Programming (ABAP™) from SAP® AG, Structured Query Language (SQL), etc.), or in assembly or machine language if desired. The language may be a compiled or interpreted language. The machine-executable instructions are not intended to be limited to any particular programming language and implementation thereof. It will be appreciated that a variety of programming languages and coding thereof may be used to implement the teachings of the disclosure contained herein.

In some implementations, memory module 112 includes an application 120 and a database 126. The application 120 is any software framework that enables users to process social media inputs acquired from various social media platforms via network 132. The application 120 may reference (or process) data stored in the database 126. In some implementations, the application 120 can be and/or include a web browser. The application may include an application programming interface (API) 150 for facilitating the harvesting or acquiring of social media inputs from the APIs of various social media platforms. In addition, the application 120 may include a user interface 140 that enables a user to access the application 120. In one embodiment, the user interface 140 includes a graphical user interface (GUI). A GUI may provide an efficient and user-friendly manner of presenting information or communicating with the computer system. For example, a GUI may include a task menu as well as one or more panels for displaying information.

The application 120 includes a data cleansing module 122, a feature extracting module 124, an unclassified sample recognition module 125, a training module 126, a model/classifier selection module 128 and a classifier module 129. The data cleansing module 122 may be configured to remove redundant elements (i.e., noise) from the social media inputs. The feature extracting module 124 may be configured to extract features from the cleaned inputs. The extracted features, for example, may have significant contribution in determining the category of the inputs. The unclassified sample recognition module 125 may be configured to recognize inputs which do not belong to any predefined categories. The recognition, for example, may be carried out by measuring the similarity between new inputs and training data in each predefined category. The training module 126 may be configured to train a plurality of models/classifiers for distinguishing each predefined categories, whereas the model/classifier selection module 128 is configured to select the best fit model among the trained models. The classifier module 129 may be configured to classify social media inputs into predefined categories using the selected best fit model. The features and functions of the various modules will be discussed in detail in the following description.

Database 126 is an organized collection of data, such as tables, queries, reports, views, and other objects. Database 126 may also include a database management system (DBMS), which is a system software for creating and managing databases 126. The DBMS provides users and programmers with a systematic way to create, retrieve, update and manage data. Database 126 may be based on a relational model, such as SAP HANA, Oracle Database, Microsoft SQL Server, MySQL, IBM DB2, IBM Informix, and so forth. Other types of database technology may also be used. In some implementations, database 126 stores social media inputs of training data sets in physical data structures (e.g., tables).

Computer system 106 may be communicatively coupled to one or more computer systems (not shown) via network 132. For example, computer system 106 may operate in a networked environment using logical connections to one or more remote computers (not shown). The remote computer may be another personal computer, a server, a router, a network PC, a peer device or other common network node, and typically includes many or all of the elements described above relative to computer system 106. Network 132 may be a local area network (LAN) or a wide area network (WAN).

Figure 2:
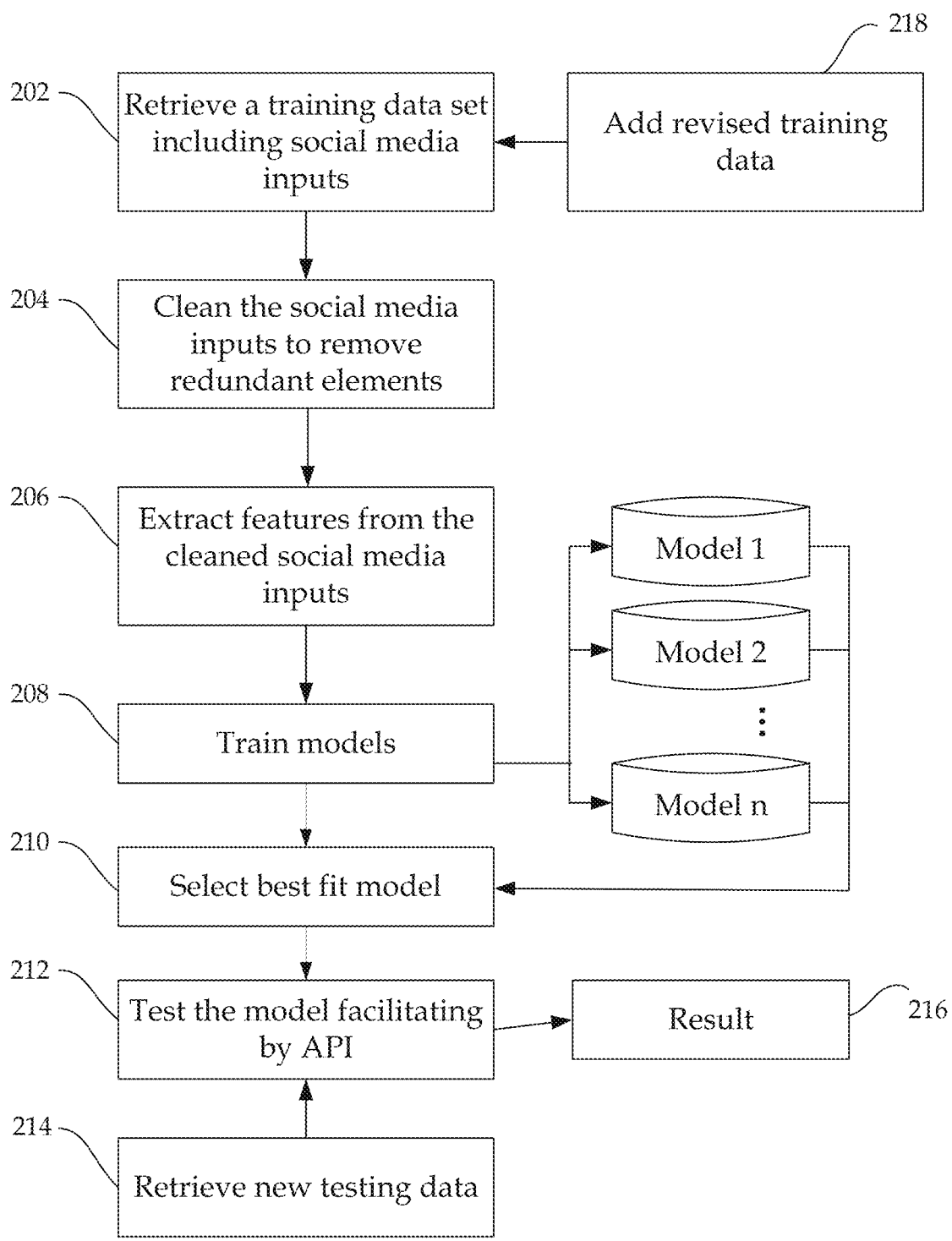
FIG. 2 shows an exemplary method for training and re-training a classifying model.

FIG. 2 shows an exemplary method 200 for training and retraining a model to categorize social media inputs. The method 200 may be performed automatically or semi-automatically by the system 100. It should be noted that in the following discussion, reference will be made, using like numerals, to the features described in FIG. 1.

At step 202, the computer system 100 retrieves a set of training data. The training data may be retrieved from, for example, the database 126. The training data includes social media inputs harvested/acquired from various social media channels such as Twitter, Facebook, LinkedIn and others. The inputs, in one embodiment, may be individually labelled and grouped into a plurality of predefined categories. The categories, for example, may be predefined as comments, complaints, queries and unclassified. Grouping the inputs into other categories may also be useful, depending on the users' needs. The user may be a business user, such as a social media customer service representative or a marketing researcher.

An input may be an expression, such as a comment or complaint, posted on a social media channel. The input may be a string of language texts, an emoji, a picture, a Uniform Resource Locator (URL) or a combination thereof. Language texts are, for example, words that are making up of roman alphabets. Some words may include special characters, such as "#" or "@" which are commonly used in a hashtag or Twitter, respectively. The special characters may also include those found on a keyboard of a computer, laptop, handheld device such as a smart phone or tablet. The language texts may also include symbolic, ideographic or logographic elements of a particular language (e.g., Chinese, Japanese, Korean, or Thai).

At step 204, the data cleansing module 122 cleans the inputs. The data cleaning module cleans the inputs by removing redundant elements from the input. The redundant elements are, for example, removed by subjecting the input to predefined conditions/filters. A redundant element refers to noisy expressions which can be omitted without substantially affecting the context or the input. In one embodiment, the redundant elements include emojis, special characters, URLs, pictures, stop words and nouns. Among the redundant elements, emojis, special characters, URLs and pictures may be filtered out using predefined conditions/filters, due to their distinguishable nature from the language texts. Predefined conditions/filters may also be used to filter out stop words. Stop words, for example, include the commonly used "is", "the", "that", "at", "which" and etc. Nouns, on the other hand, may be filtered out using Part-of-Speech (POS) tagging. For example, each word in the input is assigned to a part-of-speech, such as noun, verb and adjective. Words that are assigned as a noun are filtered out and removed.

At step 206, the feature extracting module 124 extracts features from the remaining language texts of the input. A feature is a word that is meaningful and bears an important bearing and significant contribution in determining the category of the input. In one embodiment, the weighted bag-of-words approach is adopted to identify the features from the remaining language texts. For example, the one or more features from the remaining language texts are identified using term frequency and inverse document frequency (TF-IDF) weighting. The TF-IDF weighting statistically reflects how important a word is to an input. Each word in the input has a value which increases proportionally to the number of times (frequency) the word appears in the input, but is offset by the frequency of the word in the pool of inputs. The offset makes an adjustment for the fact that some words appear more frequently in general. Each of the extracted feature is labelled according to the predefined categories and used to train a plurality of models.

In one embodiment, the feature extracting module 124 optimizes the language texts to better identify the features in an input. For example, some inputs may be too brief, making features extraction ineffective and challenging. In one embodiment, N-gram technique may be used to enhance the feature identification and extraction. An N-gram is a sequence of N words in a sentence. For example, a bi-gram is a two-word sequence of words in a sentence and a tri-gram is a three-word sequence of words in a sentence. The N-gram technique may be used to extend the length of the input by estimating the probability of the last word of an N-gram given the previous words. For example, the bi-gram technique considers the context of the previous word to estimate or predict the next possible word which extends the length of the input without muddling the actual meaning of the input. Similar to the extracted single word (i.e., extracted feature), each of the bi-gram is considered as a feature, and is extracted and labelled in a manner as previously described. For purposes of illustration, the present framework is described using bi-gram technique. However, it should be noted that the present framework may also be applied to N-gram of other sizes, such as tri-gram.

In step 208, the training module 126 trains the extracted features of the training set using various machine learning models/classifiers. In one embodiment, the various machine learning models include Random Forest, Naive Bayes, Logistic Regression and Support Vector Machine (SVM). Other types of machine learning models may also be used. Each of the models/classifiers is trained using the same extracted and labelled features of the same training set to discriminate the different categories. For example, the classifier calculates the probability that the extracted features belong to each category. The category with the highest probability would be the output category of the extracted features. During the training, each of the extracted features are a variable occupying a finite point in a feature space of a model/classifier. The feature space, according to the present framework, is divided into different parts. Each part of the feature space corresponds to a predefined category. For example, the part of feature space corresponding to the predefined category of "comments" may include a collection of variables (i.e., extracted features) which associated with "gratitude", "approving" or "complimentary" expressions, such as the word "good", "amazing" and etc. The probability of the variables associated with these expressions is therefore the highest for the predefined category of "comments" as compared to other predefined categories. On the other hand, the part of the feature space corresponding to the predefined category of "complaints" may include a collection of variables (i.e., extracted features) which associated with "dissatisfactory" or "negativity expressions" such as "slow", "bad" and etc. The collections of variables for each part of the feature space are mutually exclusive for enhancing the discrimination of each predefined category. For example, the collections of variables of category "comments" and the collections of variables of category "complaints" are mutually exclusive and each occupies a different part of the feature space.

At step 210, a model/classifier selection module 128 selects the best fit model from the plurality of trained models. In one embodiment, the model which produces the least misclassification is selected. Misclassification, for example, is reflected in an accuracy score of each trained models. That is, the model with the highest accuracy score produces the least misclassification. In one embodiment, the number of correctly predicted samples is divided by the total number of samples (i.e., training data) to obtain the accuracy score. The selected model, for example, is used to automatically process social media inputs and classify them into categories.

At step 212, the selected model is connected to the API 150 for facilitating the testing of the selected model. For example, new testing data are retrieved or harvested at step 214 from one or more social media platforms and processed through the API. The new testing data are delivered to the selected model for classification. In one embodiment, the new testing data undergo the cleaning and extraction steps as described at steps 204 and 206. These steps, for example, are compacted in the selected model.

In one embodiment, angle-based similarity of each input from the new testing data is compared to the inputs in each of the predefined categories (i.e., comments, complaints and queries). For example, angle-based similarity of a target text of the input from the new testing data is compared to the training text of the inputs in each predefined category. If the angle-based similarity between the target text and training text is smaller than a threshold value, the input is considered as the unclassified category. If the angled-based similarity is bigger than the threshold value, the input is classified by the model as one of the predefined categories (i.e., comments, complaints and queries). The angle-based similarity, for example, may include cosine similarity function.

At step 216, the training result is presented to the user. In one embodiment, the result is delivered to the API 150 and presented to the user in the form of classified labels. For example, the new testing data are classified into the predefined categories and each of them are labelled accordingly.

In one embodiment, the user is allowed to change the category of the social media inputs outputted by the selected model. For example, the user may perceive an input which has been classified as a comment more appropriate as a complaint and may change the category of the input manually from "comments" category to "complaints" category. Under such circumstance, the user may wish to re-train the models so that the accuracy of classification can be improved.

The present framework provides the flexibility of re-training the models to reflect the changes made by the user. At step 218, a new set of training data is provided to the computer system 100. The new set of training data may be stored in, for example, a database. The new set of training data includes social media inputs collected and revised by the user, for example, after the inputs are classified or grouped into categories by the trained model. The inputs, in one embodiment, may be labelled with a prior category and subsequently revised by the user to another category. In one embodiment, the revised inputs are, for example, tagged as revised inputs. The revised inputs are merged into the existing training data set and the steps 204 to 216 are repeated using the merged training data set, which includes the revised inputs, to re-select the best fit model. The re-training and re-selecting of the best fit model can be performed at the discretion of the user so long as there are incoming new training data which includes revised and weighted inputs.

It should be noted that in the following discussion, reference will be made, using like numerals, to the features described in FIG. 1. The best fit model selected in accordance with method 200, as previously described with reference to FIG. 2, is used to categorize social media inputs from social media channels selected by the user. The user may be a business user, for example, social media customer service representative or marketing researcher.

Figure 3:
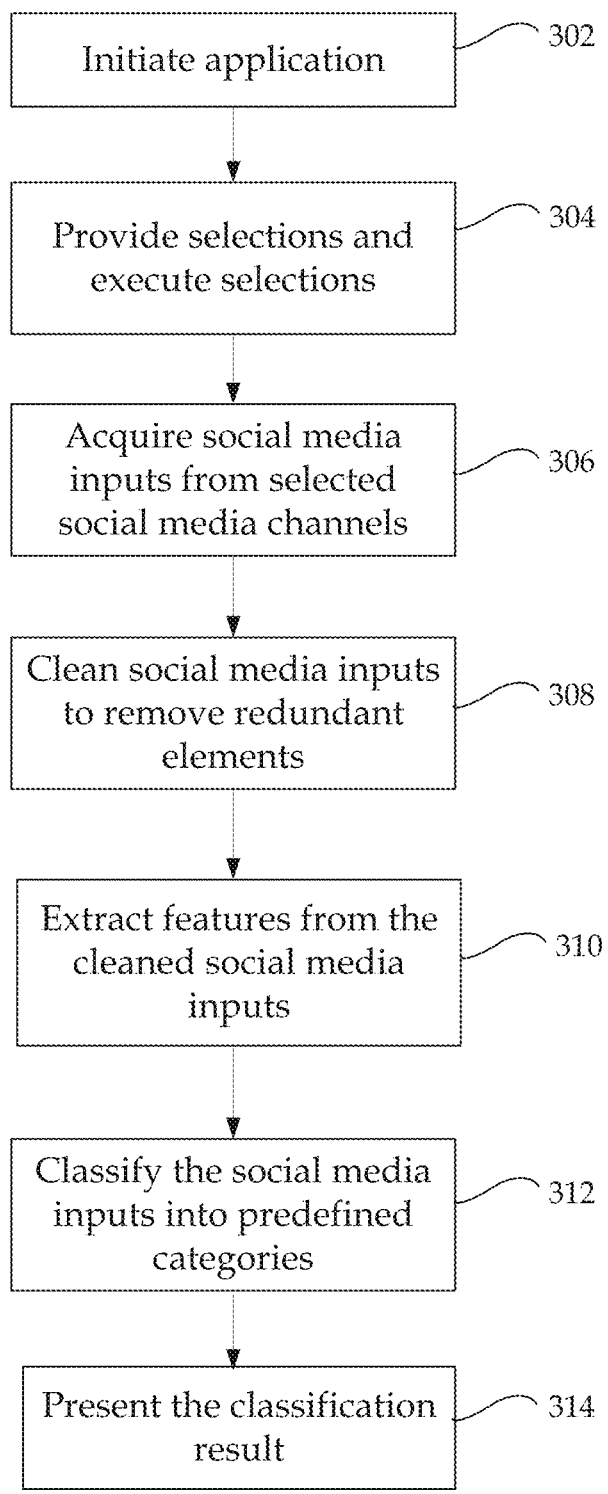
FIG. 3 shows an exemplary method for processing social media inputs.

FIG. 3 shows an exemplary method 300 for categorizing social media inputs using the selected model/classifier. The method 300 includes steps that are performed by the user and/or system 100. The method 300 may be implemented as an application 120 stored in the memory 112 of the system 100. The application may be a standalone application or an application integrated with a cloud system, such as SAP cloud system.

Figure 4:
FIG. 4 shows an exemplary first level user interface (UI) of a standalone application illustrating a start page.

At step 302, the user may launch/initiate the application 120 as a standalone application. Alternatively, the user may also launch/initiate the application 120 as an application integrated with a cloud system. FIG. 4 shows an exemplary user interface (UI) of the standalone application illustrating a first level UI or start page 401. The user interface may be, for example, graphical user interface (GUI) 140 that facilitates the user to perform certain steps of the method 300. The start page 401, for example, may be a first level UI shown as a page of a browser. To launch the application, the user may execute a start button 412 provided in the start page 401.

Figure 5:
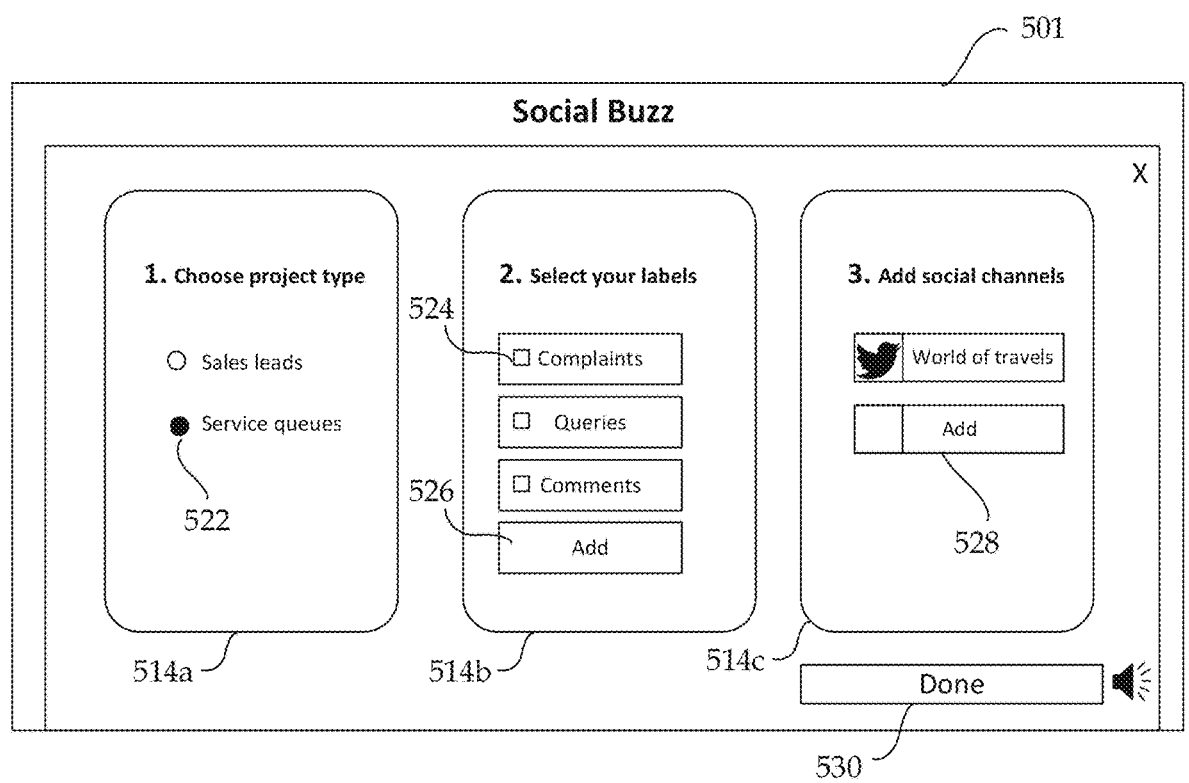
FIG. 5 shows an exemplary second level UI of a standalone application illustrating available options for user execution.

Executing the start button 412 generates a second level UI 501. The second level UI is presented to the user via the GUI 140. An exemplary second level UI is shown in FIG. 5. Similar to the first level UI 401 (i.e., start page), the second level UI 501 may also be shown as a page of a browser. As shown, the second level UI includes three panels 514a-c, displaying various options selectable by the user. The first panel 514a includes a radio element 522 which provides the user an exclusive option. As illustrated, the first panel 514a shows a list of project types which includes "sales leads" and "service queues". The second panel 514b includes a checkbox element 524 and an input element 526. The checkbox element provides the user with a list of predefined labels/categories to choose from, which includes "complaints", "queries" and "comments", whereas the input element allows the user to add more labels. The third panel 514c includes an input element 528 for allowing the user to add one or more social media channels they wish to monitor. The second level UI 501 may also include an execution button 530 for executing the selections made in the panels.

At step 304, the user provides selections in accordance to the options displayed in the panels and executes the selections. For the purpose of illustration, assume that the user selects "service queues" from the first panel, checks all the available labels in the second panel, selects one desired social media channel in the third panel and duly executes the execution button.

At step 306, executing the execution button initiates the acquiring/harvesting of social media inputs from the selected social media channels via API. The social media channels, for example, may include Twitter, Facebook, LinkedIn or others. The inputs, contrary to the inputs of the training data, are neither labelled, nor assigned to a category.

At step 308, the data cleansing module 122 cleans the inputs by removing redundant elements from the inputs in the same way as described at step 204 of method 200. For example, redundant elements such as emojis, special characters, URLs, pictures, stop words and nouns are removed from the input.

At step 310, the feature extracting module 124 extracts features from the remaining language texts of the inputs in the same way as described at step 206 of method 200. For example, TF-IDF weighting approach is use to identify the features which bear an important bearing and significant contribution in determining the category of the inputs. N-gram technique may be used to enhance the identification and extraction of the features if the inputs are short sentences.

At step 312, the classifier module 129 classifies the inputs based on the extracted features into the predefined categories selected by the user at step 304. In one embodiment, the classifier module 129 uses the best fit model/classifier selected at step 210 of FIG. 2 to classify the inputs. For example, the selected model divides the feature space into different parts, each of the part corresponds to the predefined category. The extracted features of the inputs are classified into the predefined categories. In one embodiment, the extracted features of the inputs are classified/grouped into the predefined categories in a sequence according to the time the inputs being posted on the social media channels. In the event that the classifier/model determines that the angle-based similarity of the extracted features of the inputs is smaller than the threshold, they are classified/grouped into the "unclassified" category.

Figure 6:
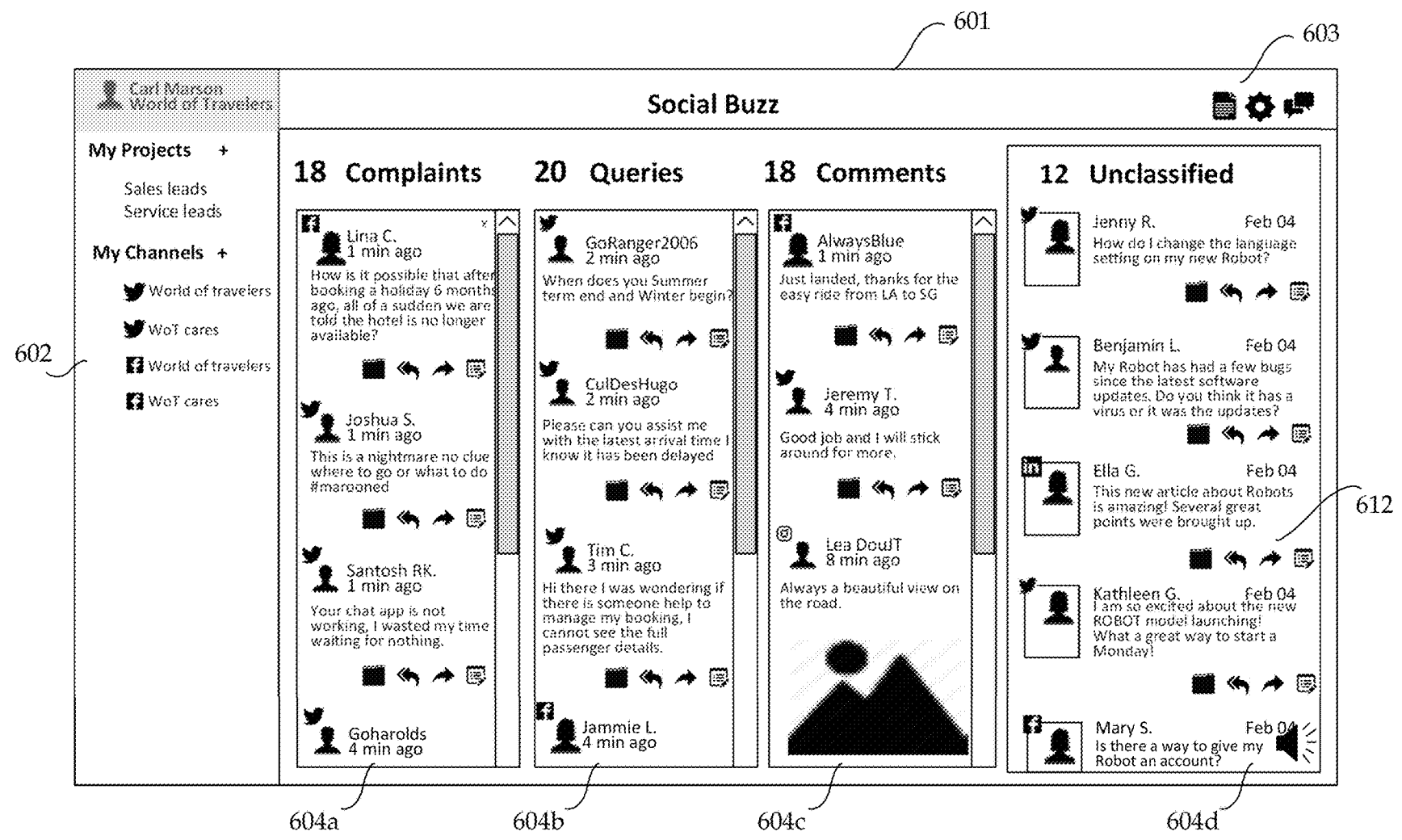

At step 314, the classification result is presented to the user via the GUI 140. For example, the result is presented on a third level UI 601. An exemplary third level UI of the standalone application is shown in FIG. 6. Similar to the first and second level UIs 401 and 501, the third level UI 601 may also be shown as a page of a browser. As shown, the third level UI includes a left panel 602, a top panel 603 and four panels 604a-d. The left panel 602 shows the selected project and monitored social media channels, whereas the top panel gives the user setting options. The first panel 604a shows the "complaints" category, the second panel 604b shows the "queries" category, the third panel 604c shows the "comments" category and the fourth panel 604d shows the "unclassified" category. In one embodiment, the inputs are grouped into the predefined categories according to time sequence.

In one embodiment, the third level UI 601 is a working interface which allows the user to carry out certain actions. For example, action buttons 612 are provided for each input. The action buttons may include a "folder" button, a "reply" button, a "forward" button and an "edit" button. The "folder" button allows the user to browse the history of the input. For example, once the "folder" button of an input is selected, a new window is launched showing the input and all the history (i.e., conversation) associated with the input. The "reply" and "forward" buttons allow the user to reply to the social media input or forward the social media input to a responsible personnel, respectively. For example, the user may reply to an input in the "complaints" category by clicking the "reply" button. The user may also forward an input in the "queries" category to a colleague who is an expert in a product or service by clicking the "forward" button. The "edit" buttons allows the user to change the category of the social media inputs. For example, the user may perceive an input which has been classified as a comment more appropriate as a complaint and may change the category of the input manually from "comments" category to "complaints" category. The user may also change the inputs in the "unclassified" category to one of the three predefined categories using the "edit" button. Alternatively, the user may "drag" and "drop" an input from one category to another. In one embodiment, the inputs which have their categories manually changed by the user are tagged and used to re-train the models in accordance with method 200 as described with reference to FIG. 2. For example, each of the inputs manually revised by the user is tagged as a "revised input" and merged into the training data set as described in step 216 of method 200.

FIG. 7 shows an exemplary UI 701 of an application integrated with a cloud system. For example, the application is integrated with SAP Cloud for Customer. Similar to the third level UI 601 of the standalone application as shown in FIG. 6, the UI 701 shows the classification result. As shown, the UI includes a left panel 702 and three panels 703a-c. The left panel 702 shows the content of the integrated workspace of the user. As shown, the "social media" tab is selected and the content is shown in all three panels 703a-c. The first panel 703a shows the class/category of the social media inputs, the second panel 703b shows the social media inputs and the third panel 703c shows the monitored/selected social media channels. Each input is displayed in a row where the category and channel of the input are displayed in the same row. Similar to UI 601 of FIG. 6, UI 701 is also a working interface which allows the user to carry out certain actions. For example, the user is allowed to change or revise the category of an input.

The framework as described herein helps the users to manage social media inputs by topic (i.e., the nature of the inputs), instead of by accounts, groups of accounts, channels or groups of channels. Managing or classifying the inputs by topic is more effective in removing noise of the inputs and eliminating ambiguity. As a result, the users are able to efficiently extract important information for prompt decision making. Furthermore, the flexibility of the present framework means that the users are allowed to freely add categories or change the category of the inputs where they see fit. The framework also provides for re-training of the models once the inputs in the "unclassified" category have been manually assigned a category by the users. As a result, the accuracy of classification can be improved. In addition, the present framework is ready to use out of box, requiring minimal on boarding effort. Therefore, it is suitable for users who have no prior machine learning knowledge.

Although the one or more above-described implementations have been described in language specific to structural features and/or methodological steps, it is to be understood that other implementations may be practiced without the specific features or steps described. Rather, the specific features and steps are disclosed as preferred forms of one or more implementations.

The invention claimed is:

1. A computer-implemented method for automatically classifying social media inputs comprising:
   acquiring one or more social media inputs from one or more social media platforms;
   cleaning the one or more social media inputs to remove redundant elements, wherein cleaning the one or more social media inputs comprises removing any nouns using part-of-speech (POS) tagging;
   extracting one or more features from a cleaned social media input, wherein the one or more features are enhanced to define a list of input features including the one or more extracted features and at least one subsequent feature;
   iteratively training a plurality of classifiers to classify social media input into a category from predefined categories, wherein the training comprises training using a training data set including social media input retrieved from a database, wherein each of the social media inputs of the training data set is labeled and assigned to one of the predefined categories;
   dynamically selecting a trained classifier from among the plurality of trained classifiers, wherein the selected trained classifier is a current best fit classifier compared to one or more other classifiers from the iteratively trained plurality of classifiers, wherein the best fit classifier is a classifier that produces least misclassification compared to classifiers of the one or more other classifiers, wherein the plurality of trained classifiers are trained over same training data; and automatically classifying, by the trained classifier, the one or more social media inputs into the predefined categories using corresponding one or more lists of input features, wherein the classifying comprises:

calculating probabilities that an extracted feature from a respective list of input features belongs to each of the predefined categories, wherein the extracted feature is extracted from a first social media input from the one or more social media inputs;

calculating probabilities that the extracted features as a subsequent feature of the at least one subsequent feature from the list of input features belongs to each of the predefined categories, wherein the probabilities are estimated based on a context of one or more n-grams of features preceding the subsequent features, wherein an n-gram includes two or more features from the list of input features and is considered as a single feature; and selecting a predefined category for each feature, wherein the selected predefined category is a category having a highest probability that a respective feature belongs to the category;

wherein the predefined categories comprise:

comments, comprising consumers' opinions or feedbacks regarding a purchased product or service received from a provider;

complaints, comprising statements or expressions of unsatisfactory and discontent regarding a purchased product or service rendered by a provider; and queries, comprising requests for information about a product or service;

wherein the extracted one or more features are variables associated with a feature space that is divided into different parts corresponding to the predefined categories, wherein collections of variables for each part of the feature space are mutually exclusive, wherein each predefined category of the predefined categories is associated with a corresponding list of predefined expressions, wherein a probability that a variable of the variables is associated with a first category from the predefined categories is the highest as compared to the other categories when the variable is associated with one of the expressions from a first list of predefined expressions corresponding to the first category.

2. The method of claim 1 comprising selecting the predefined categories.

3. The method of claim 1 wherein acquiring the one or more social media inputs comprises acquiring the social media inputs from the one or more social media platforms via an application programming interface (API).

4. The method of claim 1 wherein cleaning the one or more social media inputs comprises removing the redundant elements using one or more predefined filters.

5. The method of claim 1 wherein the redundant elements comprise emojis, special characters, Uniform Resource Locators (URLs), pictures, stop words and nouns.

6. The method of claim 1 wherein cleaning the one or more social media inputs comprises removing any stop words.

7. The method of claim 1 wherein extracting the one or more features comprises identifying the one or more features from the cleaned one or more social media inputs using term frequency and inverse document frequency (TF-IDF) weighting.

8. The method of claim 1 wherein the extracted one or more features comprises an n-gram.

9. The method of claim 1 comprising presenting a classification result to a user via a user interface.

10. The method of claim 9 wherein the presenting the classification result comprises displaying the selected predefined categories and the one or more social media inputs assigned to predefined categories.

11. The method of claim 10 wherein the method comprises:

receiving, through the user interface, input from the user to manually revise the assigned predefined category of the social media input to another predefined category;

retraining the plurality of classifiers based on the another predefined category revised by the user; and re-selecting a new trained classifier from the retrained plurality of classifiers as a new best fit classifier compared to other classifiers associated with other trained classifiers, wherein the re-selected new trained classifier is used to automatically classify the one or more social media input.

12. The method of claim 11 wherein the social media input with a revised category is tagged and re-used in re-training of one or more classifiers.

13. The method of claim 1 wherein the one or more classifiers comprises Random Forest, Naive Bayes, Logistic Regression and Support Vector Machine (SVM).

14. The method of claim 13 wherein a classifier having the highest accuracy score is selected from the one or more trained classifiers.

15. The method of claim 1 wherein the each of the classifiers comprises a feature space which is divided into different parts, wherein each of the categories occupies a part of the feature space and each part of the feature spaces includes a collection of variables.

16. A system for classifying social media inputs comprising:

a non-transitory computer-readable medium for storing a database and computer-readable program code; and one or more processors in communication with the non-transitory computer-readable medium, the one or more processors being operative with the computer-readable program code to perform operations including:

acquiring one or more social media inputs from one or more social media platforms;

cleaning the one or more social media inputs to remove redundant elements, wherein cleaning the one or more social media inputs comprises removing stop words and filtering out any nouns using part-of-speech (POS) tagging, wherein the part-of-speech tagging comprises assigning words a part-of-speech;

extracting one or more features from a cleaned social media input, wherein the one or more features are enhanced to define a list of input features including the one or more extracted features and at least one subsequent feature;

iteratively training a plurality of classifiers to classify social media input into a category from predefined categories, wherein the training comprises training using a training data set including social media input retrieved from a database, wherein each of the social media inputs of the training data set is labeled and assigned to one of the predefined categories;

dynamically selecting a trained classifier from among the plurality of trained classifiers, wherein the selected trained classifier is a current best fit classifier compared to one or more other classifiers from the iteratively trained plurality of classifiers, wherein the best fit classifier is a classifier that produces least misclassification compared to classifiers of the one or more other classifiers, wherein the plurality of trained classifiers are trained over same training data; and automatically classifying, by the trained classifier, the one or more social media inputs into predefined categories using corresponding one or more lists of input features, wherein the classifying comprises:

calculating probabilities that an extracted feature from a respective list of input features belongs to each of the predefined categories, wherein the extracted feature is extracted from a first social media input from the one or more social media inputs;

calculating probabilities that the extracted features as a subsequent feature of the at least one subsequent feature from the list of input features belongs to each of the predefined categories, wherein the probabilities are estimated based on a context of one or more n-grams of features preceding the subsequent features, wherein an n-gram includes two or more features from the list of input features and is considered as a single feature; and selecting a predefined category for each feature, wherein the selected predefined category is a category having a highest probability that a respective feature belongs to the category;

wherein the predefined categories comprise:
comments, comprising consumers' opinions or feedbacks regarding a purchased product or service received from a provider;
complaints, comprising statements or expressions of unsatisfactory and discontent regarding a purchased product or service rendered by a provider; and
queries, comprising requests for information about a product or service;
wherein the extracted one or more features are variables associated with a feature space that is divided into different parts corresponding to the predefined categories, wherein collections of variables for each part of the feature space are mutually exclusive, wherein each predefined category of the predefined categories is associated with a corresponding list of predefined expressions, wherein a probability that a variable of the variables is associated with a first category from the predefined categories is the highest as compared to the other categories when the variable is associated with one of the expressions from a first list of predefined expressions corresponding to the first category.

17. The system of claim 16 wherein the stop words comprise:
"is,"
"the"
"that,"
"at," and
"which".

18. A non-transitory computer-readable medium having stored thereon program code, the program code executable by a computer to perform steps comprising:
acquiring one or more social media inputs from one or more social media platforms;
cleaning the one or more social media inputs to remove redundant elements, wherein cleaning the one or more social media inputs comprises removing any nouns using Part-of-Speech (POS) tagging;
extracting one or more features from a cleaned social media input, wherein the one or more features are enhanced to define a list of input features including the one or more extracted features and at least one subsequent feature;

iteratively training a plurality of classifiers to classify social media input into a category from predefined categories, wherein the training comprises training using a training data set including social media input retrieved from a database, wherein each of the social media inputs of the training data set is labeled and assigned to one of the predefined categories;

dynamically selecting a trained classifier from among the plurality of trained classifiers, wherein the selected trained classifier is a current best fit classifier compared to one or more other classifiers from the iteratively trained plurality of classifiers, wherein the best fit classifier is a classifier that produces least misclassification compared to classifiers of the one or more other classifiers, wherein the plurality of trained classifiers are trained over same training data; and automatically classifying, by the trained classifier, the one or more social media inputs into predefined categories using corresponding one or more lists of input features, wherein the classifying comprises:

calculating probabilities that an extracted feature from a respective list of input features belongs to each of the predefined categories, wherein the extracted feature is extracted from a first social media input from the one or more social media inputs;

calculating probabilities that the extracted features as a subsequent feature of the at least one subsequent feature from the list of input features belongs to each of the predefined categories, wherein the probabilities are estimated based on a context of one or more n-grams of features preceding the subsequent features, wherein an n-gram includes two or more features from the list of input features and is considered as a single feature; and selecting a predefined category for each feature, wherein the selected predefined category is a category having a highest probability that a respective feature belongs to the category;

wherein the predefined categories comprise:
comments, comprising consumers' opinions or feedbacks regarding a purchased product or service received from a provider;
complaints, comprising statements or expressions of unsatisfactory and discontent regarding a purchased product or service rendered by a provider; and
queries, comprising requests for information about a product or service;
wherein the extracted one or more features are variables associated with a feature space that is divided into different parts corresponding to the predefined categories, wherein collections of variables for each part of the feature space are mutually exclusive, wherein each predefined category of the predefined categories is associated with a corresponding list of predefined expressions, wherein a probability that a variable of the variables is associated with a first category from the predefined categories is the highest as compared to the other categories when the variable is associated with one of the expressions from a first list of predefined expressions corresponding to the first category.

* * * * *